(12) United States Patent  
Harazin (10) Patent No.: US 9,297,909 B2  
(45) Date of Patent: Mar. 29, 2016

(54) GUARD EFFICIENCY COMPENSATION SYSTEM AND METHOD

(71) Applicant: PerkinElmer Health Sciences, Inc., Waltham, MA (US)

(72) Inventor: Richard R. Harazin, Lombard, IL (US)

(73) Assignee: PERKINELMER HEALTH SCIENCES, INC., Waltham, MA (US)

(*) Notice: Subject to any disclaimer, the term of this patent is extended or adjusted under 35 U.S.C. 154(b) by 0 days.

(21) Appl. No.: 14/630,047

(22) Filed: Feb. 24, 2015

(65) Prior Publication Data

US 2015/0301194 A1    Oct. 22, 2015

Related U.S. Application Data

(60) Provisional application No. 61/981,266, filed on Apr. 18, 2014.

(51) Int. Cl.
- *G01T 1/20* (2006.01)
- *G01T 1/202* (2006.01)

(Continued)

(52) U.S. Cl.
CPC .............. *G01T 1/2006* (2013.01); *G01T 1/202* (2013.01); *G01T 1/204* (2013.01); *G01T 1/208* (2013.01); *G01T 1/2026* (2013.01)

(58) Field of Classification Search
CPC ......... G01T 1/204; G01T 1/202; G01T 1/172; G01T 1/208

See application file for complete search history.

(56) References Cited

U.S. PATENT DOCUMENTS

| 2,830,188 A | * | 4/1958 | Scherbatskoy | ............ | G01T 3/06 250/264 |
| 3,842,278 A | * | 10/1974 | Noakes | ................... | G01T 1/204 250/367 |

(Continued)

FOREIGN PATENT DOCUMENTS

| EP | 0 221 626 | 5/1987 |
| GB | 1 264 186 | 2/1972 |

(Continued)

OTHER PUBLICATIONS

Jack Thomson, "Use and preparation of quench curves in liquid scintillation counting," Jan. 1, 2001, Connecticut, US, Retrieved from the Internet: http://legacy.ehs.psu.edu/radprot/Packard_quench_curves_calibration.pdf, Jun. 23, 2015.

(Continued)

*Primary Examiner* — Kiho Kim  
(74) *Attorney, Agent, or Firm* — Cesari and McKenna, LLP (57) ABSTRACT

A liquid scintillation counting system employs a guard detector efficiency compensation system to adjust sample event counts to compensate for a non-ideal guard which may not detect all cosmic and environmental gamma background noise events. The system and method determines counts of events detected coincidently by a guard detector subsystem and a sample detector subsystem in one or more energy regions as well as counts of events that are detected by the sample detector subsystem and not coincidently detected by the guard detector subsystem for the respective energy regions. The system and method calculates correction values for the respective energy regions based on the counts of coincident and non-coincident events and the guard efficiency values associated with the respective energy regions, using, for example, a quenched or unquenched sample. The system then applies the calculated correction values to counts for the respective energy regions, to produce corrected sample event counts.

24 Claims, 6 Drawing Sheets

(51) Int. Cl.
*G01T 1/204* (2006.01)
*G01T 1/208* (2006.01)

(56) References Cited

U.S. PATENT DOCUMENTS

| | | | | |
|---|---|---|---|---|
| 3,898,463 A | * | 8/1975 | Noakes | G01T 1/204 250/367 |
| 4,002,909 A | | 1/1977 | Packard et al. | |
| 4,833,326 A | * | 5/1989 | Valenta | G01T 1/172 250/362 |
| 5,146,093 A | * | 9/1992 | Valenta | G01T 1/172 250/362 |

FOREIGN PATENT DOCUMENTS

| | | |
|---|---|---|
| GB | 1 515 132 | 6/1978 |
| WO | WO 2008/095257 | 8/2008 |

OTHER PUBLICATIONS

International Search Report and Written Opinion for International Application No. PCT/US2015/022186 filed on Mar. 24, 2015 by PerkinElmer Health Sciences, Inc. mail date Jul. 3, 2015, 15 pages.

* cited by examiner

| GUARD EFFICIENCIES | | |
|---|---|---|
| Energy Region | Efficiencies Using an Unquenched Standard Sample | Efficiencies Using a Quenched Standard Sample |
| 0-3 keV | 75.2% | 69.3% |
| 3.5-7 | 78.0% | 71.7% |
| 7.5-14 | 85.8% | 78.5% |
| 14.5-28 | 89.4% | 83.9% |
| 28.5-56 | 93.1% | 90.1% |
| 56.5-112 | 95.2% | 94.0% |
| 112.5-224 | 95.9% | 95.8% |
| 224.5-448 | 93.7% | 96.3% |
| 448.5-896 | 91.0% | 97.3% |
| 896.5-1950 | 82.4% | 98.6% |

FIG. 7

GUARD EFFICIENCY COMPENSATION SYSTEM AND METHOD

CROSS-REFERENCE TO RELATED APPLICATIONS

The present application claims the benefit of U.S. Provisional Patent Application Ser. No. 61/981,266, which was filed on Apr. 18, 2014, by Richard R. Harazin for a GUARD EFFICIENCY COMPENSATION SYSTEM and is hereby incorporated by reference.

BACKGROUND OF THE INVENTION

1. Field of the Invention

The present invention relates to a liquid scintillation counting system and, more specifically, to a guard efficiency compensation system and method for a scintillation counting system.

2. Background Information

Liquid scintillation counting systems are utilized to count radiation events in a sample being tested. Such systems often utilize a lead shield to block or inhibit background radiation, from the environment, which could cause unwanted noise events to be included when counting events in the sample. Typically, the lead shield is thickest at the top of the liquid scintillation counting system where cosmic ray flux is most intense. However, as more lead is added, the overall system becomes heavy and cumbersome. In addition to the lead shield, a guard subsystem may be utilized to detect and account for background radiation that was not inhibited by the shield. Radiation events coincidently detected by the sample counting system and the guard subsystem are classified as background radiation that should not be included in the count of events in the sample. However, due to the non-ideal performance of the guard subsystem, not all background noise events are coincidently detected, and thus unwanted background noise events may still be inadvertently included in the count of events in the sample.

BRIEF DESCRIPTION OF THE DRAWINGS

The advantages of the embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A system and method for detecting radiation employs guard detector compensation based on one or more pre-determined guard efficiency values that may be determined utilizing a quenched or unquenched standard sample, to adjust sample event counts to compensate for a non-ideal guard which may not detect all background noise events. The system and method determines counts of events detected coincidently by a guard detector subsystem and a sample detector subsystem in one or more energy regions as well as counts of events that are detected by the sample detector subsystem and not coincidently detected by the guard detector subsystem for the respective energy regions. The system and method calculates correction values for the respective energy regions based on the counts of coincident and non-coincident events and the guard efficiency values associated with the respective energy regions. The system then applies the calculated correction values to sample counts for the respective energy regions, to produce corrected sample event counts.

Using the guard efficiency compensation system, the system improves the accuracy of the sample event counts by compensating for non-ideal guard performance. In addition, use of the guard detector compensation allows the system to operate efficiently in an environment in which the sample is less environmentally isolated during evaluation, and thus, more susceptible to unwanted background noise. For example, a liquid scintillation detection system using the guard detector compensation may be surrounded by relatively thin lead walls, without adversely affecting the counts of sample event of interest. Thus, the system size and weight may be significantly reduced.

Description

Figure 1:
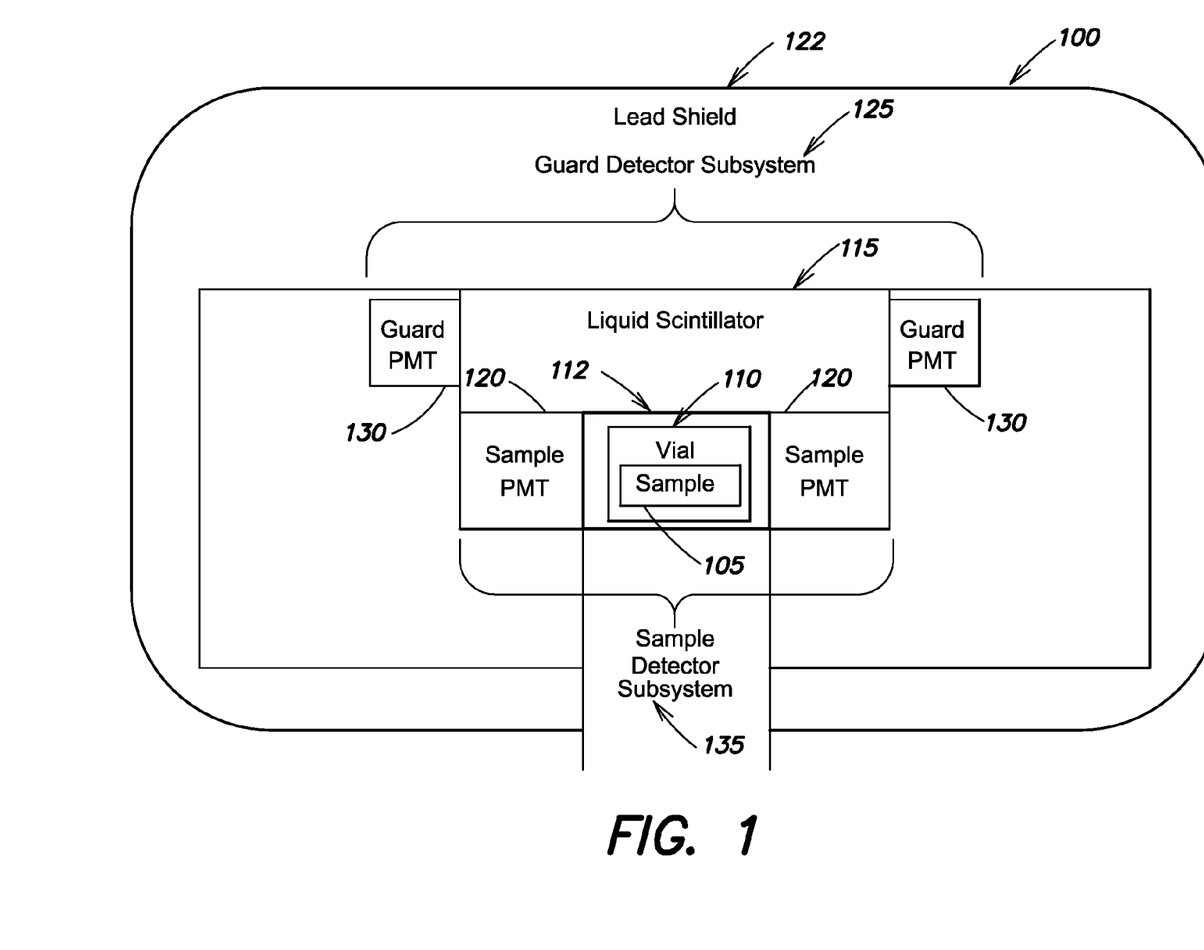
FIG. 1 is a schematic block diagram of a liquid scintillation detection system that may be utilized with the embodiments described herein.

FIG. 1 is a schematic block diagram of a liquid scintillation detection system 100 that may be advantageously used with the embodiments described herein. The liquid scintillation detection system 100 is configured to detect radioactive emissions (e.g., events) in a sample 105. Sample detector subsystem 135 includes sample photomultiplier tubes (PMTs) 120 and sample counting chamber 112. The sample 105 is placed in a vial 110 and then into the sample counting chamber 112 of the sample detector subsystem 135, where a scintillating liquid is also added to the vial 110 to transform the radiation of the sample into light pulses detected by the sample PMTs 120. The sample PMTs 120 operate simultaneously and the combined signal is analyzed to count the events in the sample 105.

To reduce unwanted cosmic and environmental background radiations (e.g., BKG noise events) that effects the counting of events in the sample 105, a lead shield 122 is utilized. In addition, a guard detector subsystem 125, including guard PMTs 130 and a liquid scintillator 115, is utilized to detect unwanted cosmic and environmental background radiations. Events that are coincidently detected at the sample PMTs 120 and the guard PMTs 130 are classified as BKG noise events that should not be included in the count of event in the sample 105. However, the guard detector subsystem 125 is non-ideal and does not detect all BKG noise events, and thus unwanted BKG noise events that were not coincidently detected, may still be inadvertently included in the count of events in the sample 105. As known by those skilled in the art, this may occur because when cosmic/gamma rays are missed by the guard detector and hit the sample, the rays can create Compton backscatter events as they travel through the sample medium.

In addition, a quenching agent, such as inorganic acids, organic acids, and extractive scintillators, may be added to the standard sample 105. As known by those skilled in the art, quenched samples produce a different measured energy distribution of Compton backscatter than do unquenched samples. Advantageously, and by utilizing a quenched sample, light output from Compton backscatter in the standard sample 105 is quenched. Use of a quenched sample makes the guard look like it has lower cosmic/gamma ray detection efficiencies in lower energy regions, and higher efficiencies in higher energy regions, as compared to the use of an unquenched sample. This effect occurs because while quench in the standard sample can shift the measured energy of Compton backscatter events to lower energy regions, the energies of cosmic/gamma events as measured by the guard detector subsystem 125 remain approximately the same whether the standard sample is quenched or unquenched.

Figure 2:
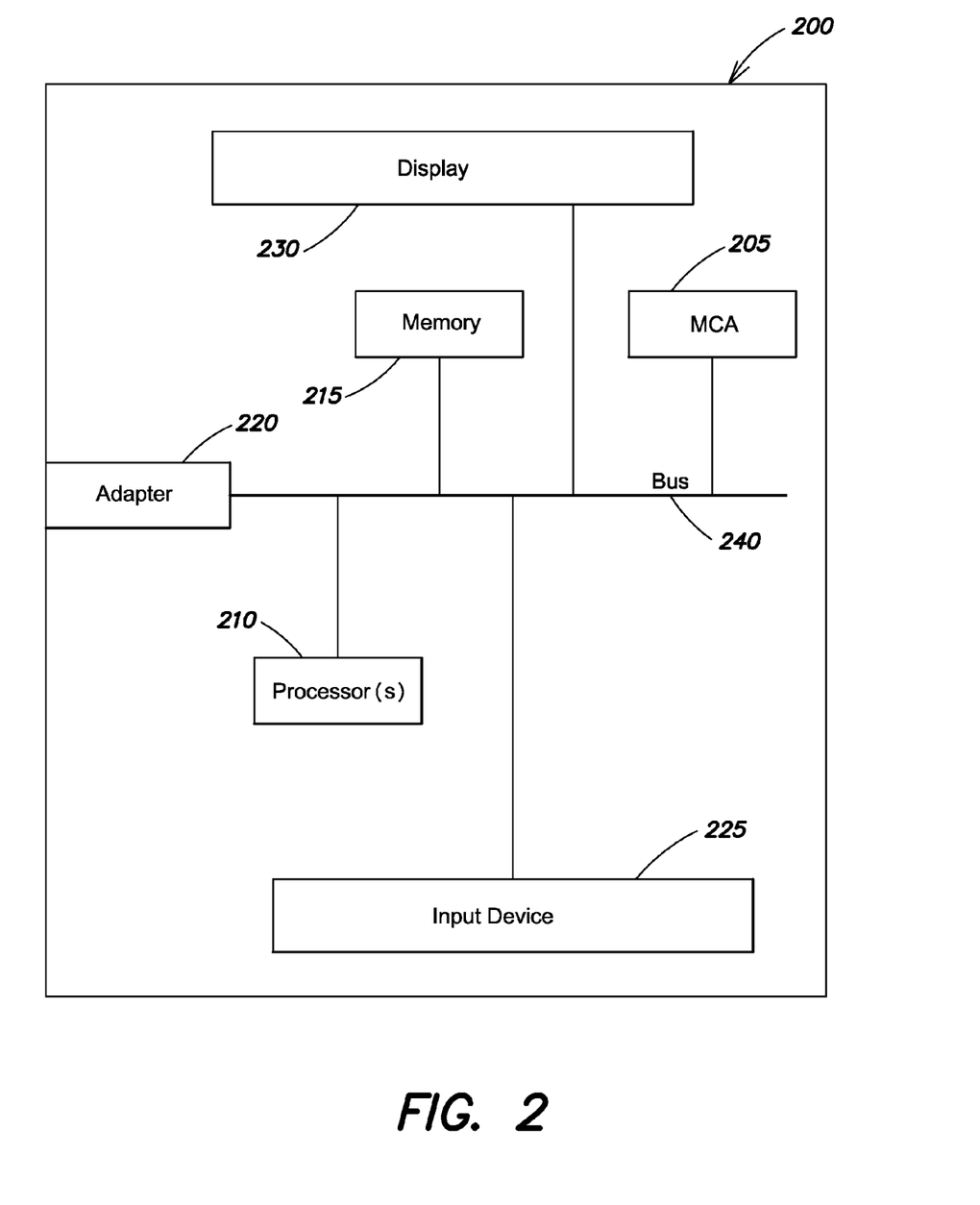
FIG. 2 is a schematic block diagram of an electronic architecture for liquid scintillation counting that may be utilized with the embodiments described herein.

FIG. 2 is a schematic block diagram of an electronic architecture 200 for liquid scintillation counting that may be advantageously used with the embodiments described herein. The electronic architecture 200 includes multiple multi-channel analyzers (MCAs) 205, one or more processors 210, a memory 215, one or more adapters 220, an input device 225, and a display 230 interconnected by a system bus 240. Each MCA 105, as known by those skilled in the art, provides sets of channels which represent different energy regions. For example, each energy region may be represented by a block of 100 channels of the MCA (e.g., energy region 0 is represented by channels 1 to 100 of the MCA, energy region 1 is represented by channels 101 to 200 of the MCA, etc.).

In an embodiment, the memory 215 includes memory locations that are addressable by the MCAs 205, processor 210 and adapters 220 for storing software programs and/or processes and data structures associated with embodiments discussed herein. The processor 210 and adapters 220 may, in turn, include processing elements and/or logic circuitry configured to execute the software programs/processes, such as, calculate the values associated with the embodiments described herein. It will be apparent to those skilled in the art that other processing and memory means, including various computer readable media, may be used for storing and executing program instructions pertaining to the embodiments described herein. It is also expressly contemplated that the various software programs, processors and layers described herein may be embodied as modules configured to operate in accordance with the disclosure, e.g., according to the functionality of a software program, process or layer.

The input device 225 includes the mechanical, electrical and signaling circuitry needed to receive input commands (e.g., from a user) that in turn causes the other components (the MCA 205, the processors 210, the memory 215, the adapters 220, and the display 230) to perform particular functions. For example, the input device may be a keyboard or a "touch screen." Further, the display 230 includes the mechanical, electrical and signaling circuitry needed to display data and information to a user utilizing the guard compensation system 200. For example, the display 230 may be a Liquid Crystal Display (LCD) screen.

The adapter 220 comprises the mechanical, electrical and signaling circuitry needed to connect the electronic architecture 200 to the liquid scintillation detection system 100 (FIG. 1). For example, the adapters 220 may be an electronic subsystem comprised of comparators to detect event trigger signals from the PMTs, analog filters to process energy signals from the PMTs, digital state machines and timing elements, and analog-to-digital converters to convert energy information into a digital format which may be used by the MCA to store events.

Figure 3:
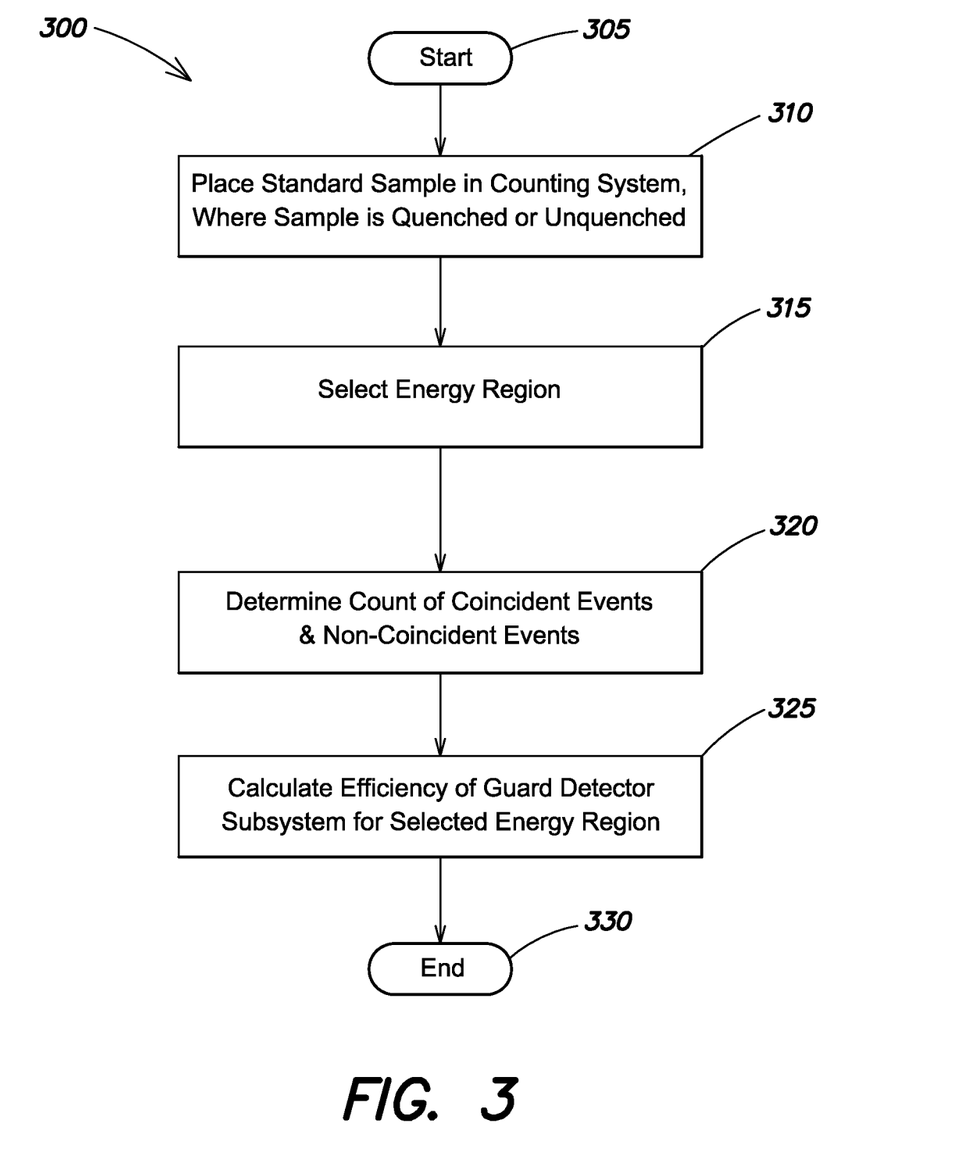
FIG. 3 is a flowchart detailing the steps of a procedure for calculating guard efficiencies associated with a guard efficiency compensation system.

FIG. 3 is a flowchart detailing the steps of a procedure 300 for calculating guard efficiencies associated with the guard detector subsystem 125. The procedure starts at step 305 and continues to step 310, where a standard sample (e.g., quenched or unquenched) having known properties is utilized as the sample 105, placed in vial 110, and placed into the sample counting chamber 112.

A quenching agent may be added to the standard sample. The quench level of the standard sample may be chosen based on the quench level of the unknown sample (e.g., customer sample) whose count is to be corrected for one or more energy regions. For example, and based on the quench level of customer sample, a user may continuously add a quenching agent to the standard sample that is being utilized to calculate the guard efficiency values, until the quench level in the standard sample approximately matches the quench level in the customer sample. The quench level of the standard sample may be within a threshold amount of the quench level of the customer sample to determine that the quench level approximately match. Specifically, tSIE (transformed spectral index of the external standard) is a quench indicating parameter used in Tri-Carb LSAs. A standard sample with a tSIE of 500 would be an approximate match for an unknown sample with a tSIE from 450 to 550 (i.e., +/−50 tSIE units). Approximate matching of the quench level of the standard sample used during the calculation of guard efficiency values to the quench level of the unknown sample provides significant improvements in BKG reduction and hence an improved figure of merit (efficiency$^2$/background) can be observed.

Figure 7:
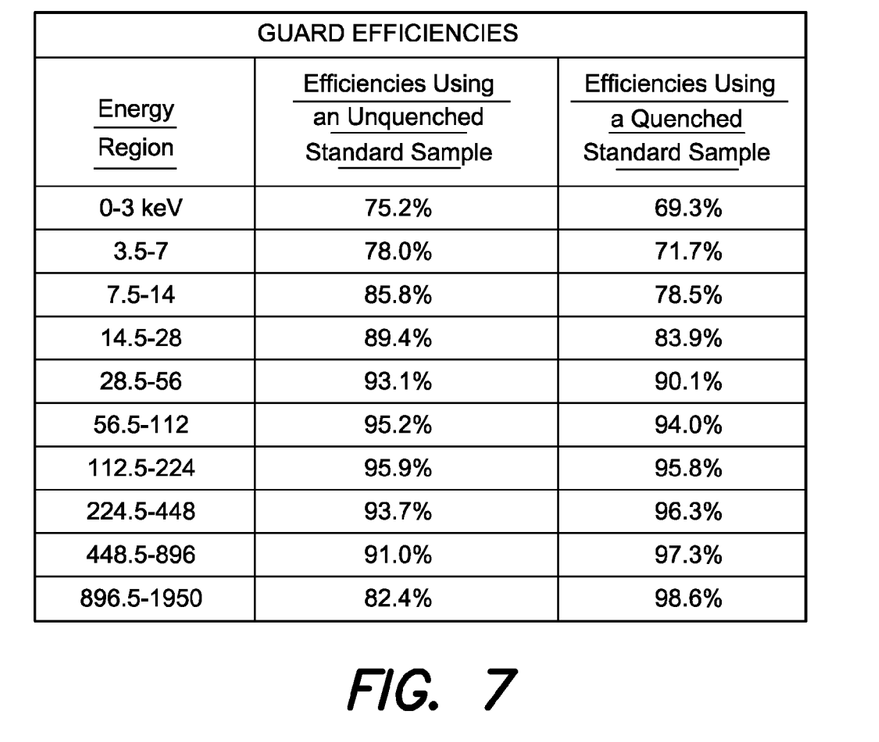
FIG. 7 is a table illustrating different guard efficiency values at different energy levels for quenched and unquenched samples.

More specifically, as known by those skilled in the art, adding a quenching agent to the standard sample prevents some light from getting to the detectors. Quench is a reduction in system efficiency as a result of energy loss in the liquid scintillation solution, i.e., the sample. Because of quench, the energy spectrum detected from radionuclide events appears to shift towards a lower energy. In addition, and due to this shift, at lower energy levels a sample with a quenching agent will have a higher count of Compton backscatter when compared to a sample that is unquenched, while at higher energy levels a sample with a quenching agent will have a lower count of Compton backscatter when compared to sample that is unquenched, as illustrated in FIG. 7. As depicted in FIG. 7, use of a quenched sample 105 makes the guard look like it has lower cosmic/gamma ray detection efficiencies in lower energy regions, and higher efficiencies in higher energy regions, as compared to the use of an unquenched sample 105. It is noted that the values in FIG. 7 are simply for illustrative purposes and that other values may be associated with the energies values for the quenched and unquenched samples.

Further, as known by those skilled in the art, the standard sample exhibits low count per minute (CPM) and disintegrations per minute (dpm) values (i.e. a background standard). At step 315, input is received on input device 225 to control the MCA 205 and select an energy region. For example, a user may enter the value of "1" on the input device 225 indicating that the user is selecting energy region 1 of the 10 available energy regions. In one or more alternative embodiments, a wide energy gamma emitter (e.g., 152Eu) may be utilized to externally irradiate liquid scintillation counting system 100 to greatly outnumber the effect of other types of BKG noise events which the guard detector subsystem 125 would not otherwise detect.

At step 320, the count of coincident and non-coincident events are determined simultaneously. Specifically, the coincident events are the events that are coincidently detected at both the sample counting PMTs 120 and the guard PMTs 130 for the selected energy region. The non-coincident events are those events that are detected at the sample counting PMTs 120 but not detected at the guard PMTs 130 for the selected energy region. It is noted that the processor 210 determines the count of coincident and non-coincident events, or a separate counting electronic device determines the count of coincident events. At step 325, and based on the count of coincident and non-coincident events, an efficiency of the guard detector subsystem 125 for the selected energy region is calculated. Specifically, the processor 210 performs the following calculation to calculate the efficiency of the guard detector subsystem 125 for the selected energy region ($GE_R$):

$$GE_R = \frac{SP12_R}{SP12_R + SP11_R}$$

where $SP12_R$ is the count of coincident events, and $SP11_R$ is the count of non-coincident events count for the energy region R. It is noted that counts $SP12_R$ and $SP11_R$ are from events which were stored in MCAs where the energies of the events were determined by the sample counting PMTs. It is also noted that the efficiency of the guard subsystem is then determined for each of the other energy regions. At step 330 the procedure ends.

It is noted that the data obtained when calculating guard efficiencies is saved for later use, for example, in memory 215, when unknown samples are counted and corrected using guard compensation from the electronic architecture 200. Further it is noted that once the guard efficiencies for regions of interest have been calculated, any external gamma emitter may be removed and the system is ready to correct unknown samples using guard compensation.

Figure 4:
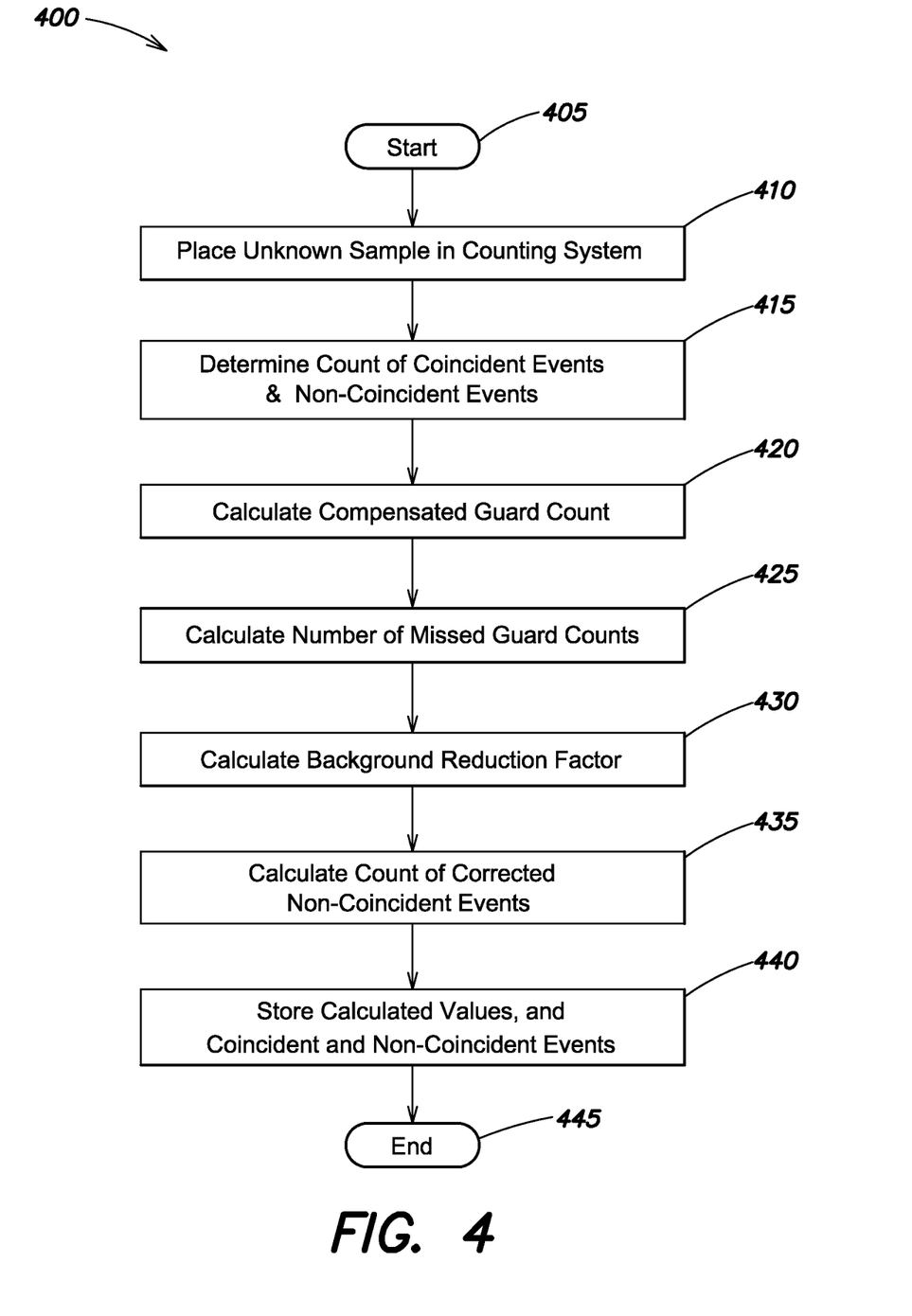
FIG. 4 is a flowchart detailing the steps of a procedure for calculating correction values associated with the guard detector subsystem and its associated guard efficiencies.

FIG. 4 is a flowchart detailing the steps of a procedure 400 for calculating correction values associated with the guard detector subsystem 125 and its associated guard efficiencies. The procedure starts at step 405 and continues to step 410 where an unknown sample is utilized as the sample 105, placed in vial 110, and placed into the sample counting chamber 112. It is noted that the unknown sample may have an associated quench level that, for example, approximately matches the quench level of the standard sample utilized to determine the guard efficiency values. That is, based on the calculated quench level of the unknown sample, guard efficiency values, calculated with a sample having a quench level that approximately matches the quench level of the unknown sample, may be utilized. At step 415, the count of coincident and non-coincident events for the selected energy region are simultaneously determined. For example, it may be determined that the count of coincident events is 1381 and the count of non-coincident events is 265. At step 420, a compensated guard count (e.g., the actual number of BKG noise events that should have been coincidentally detected by the guard detector subsystem) is calculated. Specifically, the processor 210 performs the following calculation to calculate the compensated guard count for the selected energy region ($CGC_R$):

$$CGC_R = \frac{SP12_R}{GE_R}$$

where $SP12_R$ is equal to the counts from the unknown sample that were detected coincidentally by both the sample counting PMTs and guard PMTs. Thus, for the illustrative example, if the guard efficiency for the region of interest is 92%, the compensated guard count for energy region 1 ($CGC_1$) is 1501.09 (1381/0.92), indicating that 1501.09 events is the actual number of BKG noise events which should have been counted by both the sample PMTs 120 and guard PMTs 130. Again, it is noted that the guard efficiency for the region may be calculated, in the manner described above, utilizing a standard sample having a quench level that approximately matches the quench level of the unknown sample.

At step 425, the count of events missed by the guard detector subsystem 125 (that should have been coincidentally detected by the sample PMTs 120 and guard PMTs 130) is calculated. Specifically, the processor 210 performs the following calculation to calculate the count of events missed (but were actually caused by background radiation) by the guard detector subsystem ($GCM_R$):

$$GCM_R = [CGC_R - SPR12_R]$$

Thus, for the illustrative example, the number of events missed by the guard detector subsystem 125 for energy region 1 is 120.09 (1501.09−1381).

At step 430, the count of missed events (i.e., recovered guard count) is used to generate a background reduction factor ($BRF_R$) that is applied to the normal sample PMT count data. Background reduction factors are used instead of subtracting the missed events from the sample count data so that generating negative CPM values is less likely, and spectral shape is maintained. The background reduction factors are typically limited in software from 0.05 to 1.0 in order to prevent under or over correction of the sample (beta) spectrum counts. Specifically, the processor 210 performs the following calculation to calculate the background reduction factor for the particular region ($BRF_R$):

$$BRF_R = 1 - \left[\frac{GCM_R}{SP11_R}\right]$$

Thus, for the illustrative example, the background reduction factor for energy region 1 ($BRF_1$) is 0.55 (1−[120.09/265]). At step 435, the background reduction factor ($BRF_R$) is utilized to calculate a count of corrected non-coincident events (corrected $SP11_1$) indicating a number of BKG noise events that were incorrectly included in the count of events in the sample. Specifically, the processor 210 performs the following calculation to calculate a count of corrected non-coincident events (corrected $SP11_1$):

Corrected $SP11_1 = SP11_1 * BRF_R$

Thus, in this example, the corrected $SP11_1$ is (265*0.55), indicating that the actual number of non-coincident events is 146 for energy region 1, to account for the non-ideal characteristics of the guard detector subsystem 125. In practice, the background reduction factors for each energy region are applied directly to the counts in each channel of the specific energy regions in order to better maintain spectral shape.

It is noted that the calculated values may be displayed on display 230. At step 440, the calculated values (e.g., $GE_R$, $CGC_R$, $GCM_R$, and $BRF_R$, and corrected $SP11_1$) are stored.

Specifically, the calculated values are stored in memory 215. It is noted that input may be received on input device 225 (e.g., by a user) to alter the control of the MCA 205 to select one or more different energy regions to calculate the values associated with the guard detector subsystem 125 for such regions, in a similar manner as described above. Specifically, in an embodiment, the values may be calculated for 10 logarithmically spaced energy regions. At step 445, the procedure ends.

It is noted that the strength of the guard compensation correction may be adjusted to account for different sample compositions and vial types. Specifically, the input device 225 may receive one or more input values associated with the sample compositions and vial type. The processor 210 may utilize the input values to add/subtract one or more standard deviations to the stored count data, which changes the measured (actual) guard efficiencies. It is noted that increasing the guard efficiencies decreases the amount of correction applied by the subsequent correction factor calculations, and decreasing the guard efficiencies increases the amount of correction applied by the subsequent correction factor calculations. When adjusting guard compensation correction strength, modifying the original stored data taken in manufacturing which is used to generate guard efficiencies is preferable to modifying the user's count data from the unknown sample. This is because the count time and therefore the statistics of the original stored data are well controlled in the manufacturing process. Mathematically, the guard efficiency strength equations are:

$$SP12_{RS} = SP12_R - \left[\text{Strength} * \sqrt{SP12_R}\right]$$
$$SP11_{RS} = SP11_R + \left[\text{Strength} * \sqrt{SP11_R}\right]$$
$$GE_{RS} = \frac{SP12_{RS}}{SP12_{RS} + SP11_{RS}}$$

Where:
$GE_{RS}$=strengthened/weakened guard efficiency for energy region R;
Strength=Guard compensation correction strength factor—may be positive or negative (e.g., −10 to +10);
$SP12_{RS}$=sum of the sample PMT counts coincident w/guard ($SP12_n$) in region R after subtracting/adding "Strength" number of standard deviations of $SP12_R$;
$SP11_{RS}$=sum of the sample PMT counts NOT coincident w/guard ($SP11_n$) in region R ("regular" sample counts) after adding/subtracting "Strength" number of standard is deviations of $SP11_R$.

It is noted that counts $SP11_R$ and $SP12_R$ are taken from the previously stored data generated when a background standard was counted while a wide energy gamma emitter (e.g., 152Eu) externally irradiated the liquid scintillation counting system 100. It is also noted that the square root of the counts is equal to one standard deviation of the counts. Further, $GE_{RS}$ values may then be used in place of $GE_R$ in the flowchart of FIG. 4.

Figure 5:
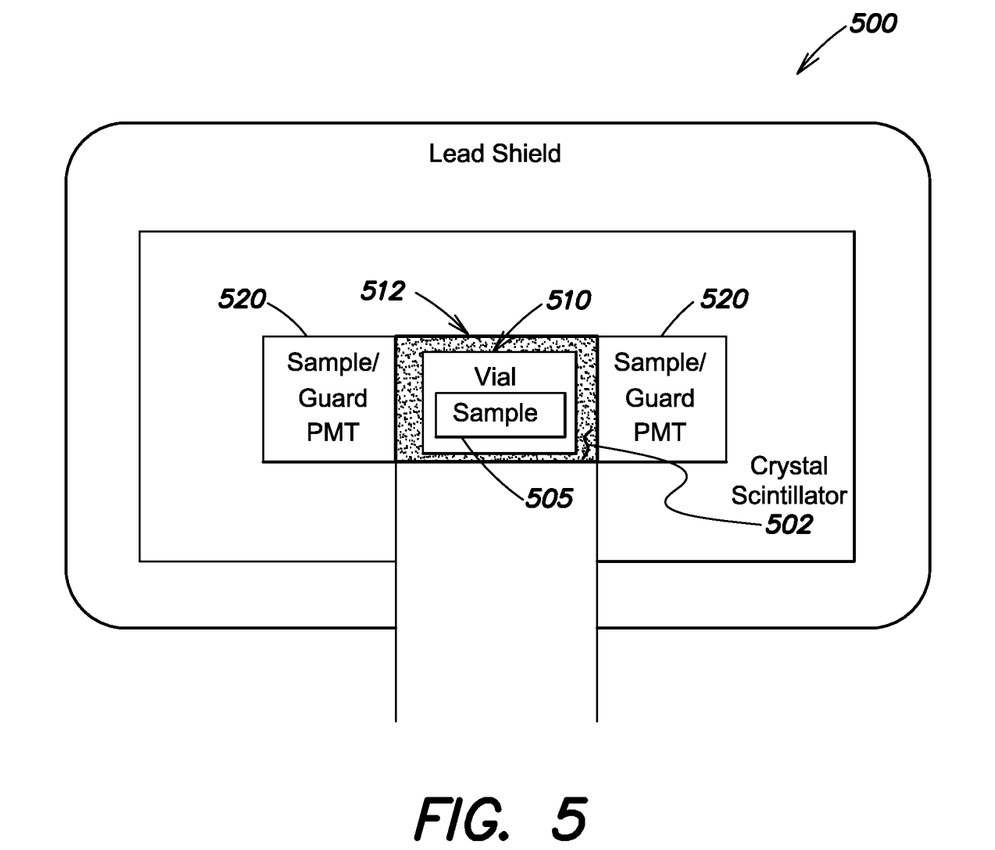
FIG. 5 is a schematic block diagram of a liquid scintillation detection system that may be utilized with the embodiments described herein.

FIG. 5 is a schematic block diagram of an alternative liquid scintillation detection system 500 that may be advantageously used with the embodiments described herein. The liquid scintillation detection system 500 is configured to detect radioactive emissions (e.g., events) in a sample 505. A crystal scintillator guard 502 with a built in aperture for the sample vial is mounted in the counting chamber such that it is in intimate contact with the sample/guard PMTs 520. The sample is placed in a vial 510 that is placed in sample counting chamber 512 and within the crystal scintillator guard 502, where the radiation is detected as light by sample/guard PMTs 520. Again, a quenching agent may be added to the sample to determine guard efficiency values associated with the crystal scintillator guard 502. The quench level of the of the sample may be chosen based on the quench level of the standard sample whose count is to be corrected for one or more energy regions. For example, and based on the quench level of customer sample, a user may continuously add a quenching agent to the sample that is being utilized to calculate the guard efficiency values, until the quench level in the sample approximately matches the quench level in the customer sample. The crystal scintillator guard 502 is in close proximity with the sample/guard PMTs 520 for detecting cosmic and environmental background noise events as known by those skilled in the art.

The crystal scintillator guard 502 is non-ideal and does not detect all background noise events. Specifically, and as known by those skilled in the art, the background noise events are beta spectrum events in coincidence with external cosmic and gamma spectrum events, also known as the SP12 spectrum. However, in this particular embodiment, the gamma spectrum generated by the crystal scintillator guard 502 does not correlate well with the background count in the sample (beta) spectrum that was caused by external cosmic and gamma radiation. As such, the electronic architecture 500 may expressly transform the gamma spectrum into one that follows a Compton backscattering profile that approximates the SP12 spectrum as observed in the first liquid scintillation detector system 100 described previously. Specifically, the transform effectively changes the counts in each channel of the gamma MCA into a rectangle which starts at the energy channel and ends at 0 keV. The area of each rectangle is equal to the number of counts in the channel. The rectangles are then summed into the transformed spectrum. The number of counts in the transformed spectrum is equal to that of the original gamma spectrum, only the distribution has changed to better approximate that of a "beta in coincidence with gamma" spectrum. The transformed gamma spectrum may be used for the SP12 data on the liquid scintillation counting system having a crystal.

Figure 6:
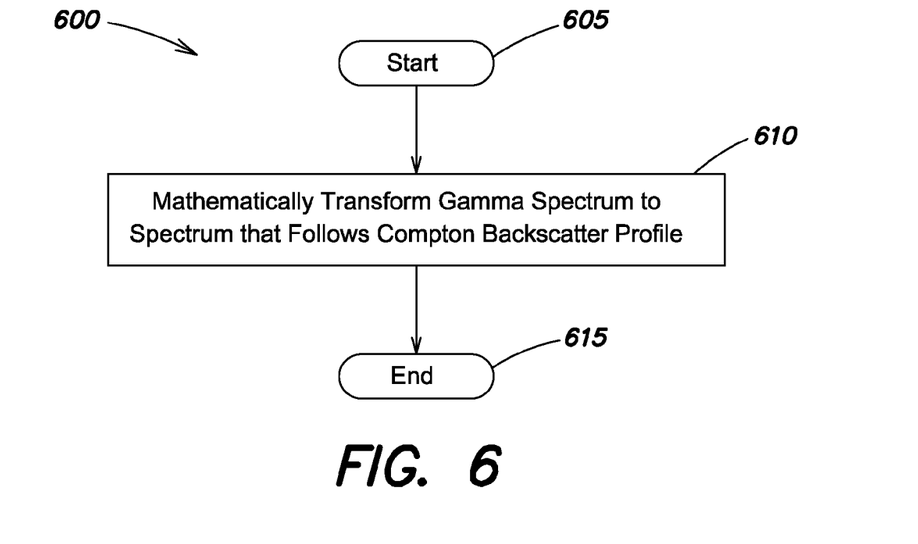
FIG. 6 is a flowchart detailing the steps of a procedure for transforming the external cosmic and gamma spectrum associated with the liquid scintillation detection system.

FIG. 6 is a flowchart detailing the steps of a procedure 600 for transforming the external cosmic and gamma spectrum associated with the liquid scintillation detection system 500. The procedure starts at step 605 and continues to step 610 where the external cosmic and gamma spectrum is mathematically transformed into a spectrum that follows a Compton backscatter profile that approximates a SP12 spectrum. At step 615, the procedure ends. This transformed spectrum is then used in place of the SP12 spectrum in flowcharts 300 and 400 and their associated methods and equations.

Using the system described herein, the accuracy of the sample event counts may be significantly improved without increased shielding or even with reduced shielding. In addition, the system allows for efficient operation in an environment in which the sample is less environmentally isolated during evaluation, and thus, more susceptible to unwanted background noise. For example, a liquid scintillation detection system may be built which is surrounded by relatively thin lead walls, without adversely affecting the counts of sample event of interest. Thus, the system size and weight may be significantly reduced. Further, and as known by those skilled in the art, performance of a liquid scintillation counting system may be measured based on its counting sensitivity, that is expressed as $E^2/B$ (where E is the counting efficiency and B is the background count rate). Tests have shown that utilizing the embodiments described herein, the sensitivity of the liquid scintillation counting system 100 may increase by 600%.

The foregoing description has been directed to specific embodiments. It will be apparent, however, that other variations and modifications may be made to the described embodiments, with the attainment of some or all of their advantages. It is expressly contemplated that the procedures, processes, and methods described herein may be implemented in alternative orders. Further, although a single device is described as performing the steps as described in FIG. 3-6, it is expressly contemplated that a plurality of devices may be utilized to calculate the values above. In addition, different samples having different quench levels may be utilized to determine one or more guard efficiency values for different energy regions. For example, a sample having a first quench level may be utilized to calculate the guard efficiency values for the different energy levels, and a second sample having a second different quench level may be utilized to calculate the guard efficiency values for the different energy levels. Thereafter, and when calculating correction values for the unknown sample, the guard efficiency values utilized may be selected based on the quench level of the standard sample (utilized to calculate the guard efficiency values) which most closely approximates the quench level of the unknown sample. Accordingly this description is to be taken only by way of example and not to otherwise limit the scope of the invention. Therefore, it is the object of the appended claims to cover all such variations and modifications as come within the true spirit and scope of the invention.

What is claimed is:

1. A radiation detection system comprising:
   a scintillator configured to detect sample events associated with an unknown sample;
   a guard detector subsystem configured to detect active guard events;
   one or more processors adapted to:
     count coincident events that are the sample events and the active guard events detected coincidently in one or more energy regions and count non-coincident events that are the sample events detected when the active guard events are not coincidently detected; and
     for each energy region
       calculate a compensation guard count based on the count of coincident events and a predetermined guard efficiency value associated with the energy region,
       calculate a correction value that is based on the compensation guard count and the counts of coincident events and the count of non-coincident events, and
       correct the count of non-coincident events corresponding to the energy region based on the calculated correction value to produce corrected sample event counts.

2. The radiation detection system of claim 1 wherein the scintillator is a liquid scintillator.

3. The radiation detection system of claim 1 wherein the scintillator is a crystal scintillator.

4. The radiation detection system of claim 1 wherein the predetermined guard efficiency value is calculated for the respective energy regions using the count of coincident events and the count of non-coincident events that occur when the system is operating in a controlled environment.

5. The radiation detection system of claim 4 wherein the controlled environment includes a source of known radiation.

6. The radiation detection system of claim 1 wherein the predetermined guard efficiency value for a given energy region is calculated as:

$$GE_R = \frac{SP12_R}{SP12_R + SP11_R}$$

where $SP12_R$ is the count of coincident events, and $SP11_R$ is the count of non-coincident events within the energy region R utilizing a standard sample.

7. The radiation detection system of claim 6 wherein the compensation guard count for a given energy region is:

$$CGC_R = \frac{SP12_R}{GE_R}.$$

8. The radiation detection system of claim 7 wherein a number of counts missed by the guard subsystem ($GCM_R$) is:

$$GCM_R = CGC_R - SP12_R.$$

9. The radiation detection system of claim 8 wherein the correction value is a background reduction factor ($BRF_R$) that is calculated as:

$$BRF_R = 1 - \left[\frac{GCM_R}{SP11_R}\right].$$

10. The radiation detection system of claim 8 wherein the given energy region is associated with a plurality of channels and the corrected sample event counts are calculated for the respective channels as:

$$CSP11_n = SP11_n \times BRF_R$$

where $CSP11_n$ is the corrected counts of non-coincident events for channel n in the energy region R.

11. The radiation detection system of claim 1 wherein guard compensation correction may be adjusted based on modifying the guard efficiency value.

12. The radiation detection system of claim 1 wherein the predetermined guard efficiency value associated with each energy region is calculated utilizing a sample that is unquenched.

13. The radiation detection system of claim 1 wherein the predetermined guard efficiency value associated with each energy region is calculated utilizing a sample with a selected quench level.

14. A radiation detection system comprising:
   a liquid scintillator configured to detect events in a beta spectrum;
   a crystal scintillator guard configured to detect events in a gamma spectrum;
   one or more processors adapted to:
     mathematically transform the gamma spectrum into a spectrum that follows a Compton backscatter profile that approximates a SP12 spectrum; and
     count coincident events between the beta spectrum and the transformed gamma spectrum for one or more energy regions and count non-coincident events that are only in the beta spectrum; and
     for each energy region
       calculate a compensation crystal scintillator guard count based on the count of coincident events and a predetermined crystal scintillator guard efficiency value associated with the energy region, calculate a correction value that is based on the compensation crystal scintillator guard count and the counts of coincident and non-coincident events, and correct counts of non-coincident events in the beta spectrum and corresponding to the energy region based on the calculated correction value.

15. A radiation detection system comprising:
a scintillator configured to detect sample events;
a guard detector subsystem configured to detect active guard events;
one or more processors adapted to:
   count coincident events that are the sample events and the active guard events detected coincidently in one or more energy regions and count non-coincident events that are the sample events detected when the active guard events are not coincidently detected, wherein the count is based on utilization of an unknown sample; and
   for each energy region:
      calculate a compensation guard count based on the count of coincident events and a predetermined guard efficiency value associated with the energy region based on utilization of a standard sample having a quench level.

16. The radiation detection system of claim 15 wherein the one or more processors are further adapted to:
calculate a correction value that is based on the compensation guard count and the counts of coincident events and the count of non-coincident events, and
correct the count of non-coincident events corresponding to the energy region based on the calculated correction value to produce corrected sample event counts.

17. The radiation detection system of claim 16 wherein predetermined guard efficiency value for a given energy region is calculated as:

$$GE_R = \frac{SP12_R}{SP12_R + SP11_R}$$

where $SP12_R$ is the count of coincident events, and $SP11_R$ is the count of non-coincident events within the energy region R utilizing the standard sample.

18. The radiation detection system of claim 17 wherein the compensation guard count for a given energy region is:

$$CGC_R = \frac{SP12_R}{GE_R}.$$

19. The radiation detection system of claim 18 wherein a number of counts missed by the guard detector subsystem ($GCM_R$) is:

$$GCM_R = CGC_R - SP12_R.$$

20. The radiation detection system of claim 19 wherein the correction value is a background reduction factor ($BRF_R$) that is calculated as:

$$BRF_R = 1 - \left[\frac{GCM_R}{SP11_R}\right].$$

21. The radiation detection system of claim 19 wherein the given energy region is associated with a plurality of channels and the corrected sample event counts are calculated for the respective channels as:

$$CSP11_n = SP11_n \times BRF_R$$

where $CSP11_n$ is the corrected counts of non-coincident events for channel n in the energy region R.

22. The radiation detection system of claim 15 wherein the quench level for the standard sample is selected based on a different quench level associated with the unknown sample, wherein the unknown sample has an incorrect count number based on the inefficiencies of the scintillator guard.

23. The radiation detection system of claim 15 wherein the scintillator is a liquid scintillator.

24. The radiation detection system of claim 15 wherein the scintillator is a crystal scintillator.

* * * * *